(12) United States Patent
Englekirk

(10) Patent No.: US 12,009,744 B2
(45) Date of Patent: Jun. 11, 2024

(54) CHARGE PUMP WITH FRACTIONAL NEGATIVE VOLTAGE OUTPUT

(71) Applicant: pSemi Corporation, San Diego, CA (US)

(72) Inventor: Robert Mark Englekirk, Littleton, CO (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 17/948,770

(22) Filed: Sep. 20, 2022

(65) Prior Publication Data

US 2024/0097565 A1 Mar. 21, 2024

(51) Int. Cl.
*H02M 3/07* (2006.01)
(52) U.S. Cl.
CPC .................................. *H02M 3/071* (2021.05)
(58) Field of Classification Search
None
See application file for complete search history.

(56) References Cited

U.S. PATENT DOCUMENTS

| | | | | |
|---|---|---|---|---|
| 7,504,877 B1 * | 3/2009 | Voogel | .................... | H02M 3/07 363/59 |
| 7,667,529 B2 * | 2/2010 | Consuelo | ............... | G11C 5/145 327/156 |
| 7,782,027 B2 * | 8/2010 | Williams | ................ | H02M 3/07 363/60 |
| 8,044,707 B2 * | 10/2011 | Saman | .................... | H02M 3/07 363/60 |
| 8,310,218 B2 * | 11/2012 | Williams | .................. | G05F 3/16 323/265 |

(Continued)

FOREIGN PATENT DOCUMENTS

| JP | 05091725 | 4/1993 |
|---|---|---|
| JP | 06165482 | 6/1994 |

(Continued)

OTHER PUBLICATIONS

Lee, Kang H., International Search Report and Written Opinion received from KIPO dated Dec. 15, 2023 for appln. No. PCT/US2023/031512, 9 pgs.

*Primary Examiner* — Thomas J. Hiltunen
(74) *Attorney, Agent, or Firm* — JAQUEZ LAND GREENHAUS & McFARLAND LLP; John Land, Esq.

(57) ABSTRACT

Charge pump circuits having a fractional negative voltage output from a positive voltage input. A control circuit provides for feedback control of the output of such a charge pump, and may include dynamic adjustment of the charge pump output based on one or more factors. In some embodiments, two or more charge pumps are coupled in a differential configuration such that while one set of capacitors are in series charging, at least one other set of capacitors is discharging. One embodiment encompasses a fractional negative voltage charge pump including n≥2 capacitors configured to be coupled in series between an input voltage and ground during a charging phase, and in parallel between ground and an output terminal during a discharging phase. The fractional negative voltage charge pump outputs a negative voltage that is no more than 1/n of a positive voltage input in magnitude.

4 Claims, 8 Drawing Sheets

(56) References Cited

U.S. PATENT DOCUMENTS

| | | | |
|---|---|---|---|
| 8,619,444 B2* | 12/2013 | Kawasoe | G09G 3/3696 |
| | | | 363/59 |
| 9,065,392 B2* | 6/2015 | Myles | H02M 3/07 |
| 9,071,128 B2* | 6/2015 | Takida | H02M 3/07 |
| 9,264,053 B2* | 2/2016 | Englekirk | H02M 3/07 |
| 9,293,986 B2* | 3/2016 | Thandri | H03F 1/025 |
| 9,479,050 B1* | 10/2016 | Reddy | H02M 3/07 |
| 9,484,809 B2* | 11/2016 | Floyd | G11C 5/145 |
| 9,917,507 B2* | 3/2018 | Reddy | H03L 7/18 |
| 9,997,999 B2* | 6/2018 | Petersen | H02M 1/15 |
| 11,011,981 B1 | 5/2021 | Englekirk | |
| 2018/0026528 A1 | 1/2018 | Xiong et al. | |

FOREIGN PATENT DOCUMENTS

| | | |
|---|---|---|
| JP | 2002315308 | 10/2002 |
| WO | 2021134834 | 7/2021 |

* cited by examiner

CHARGE PUMP WITH FRACTIONAL NEGATIVE VOLTAGE OUTPUT

BACKGROUND

(1) Technical Field

This invention relates to electronic circuits, and more particularly to power converter circuits.

(2) Background

Many electronic products, particularly mobile computing and/or communication products and components (e.g., notebook computers, ultra-book computers, tablet devices, LCD and LED displays) require multiple voltage levels. For example, radio frequency transmitter power amplifiers may require relatively high voltages (e.g., 12V or more), whereas logic circuitry may require a low voltage level (e.g., 1-2V). Still other circuitry may require an intermediate voltage level (e.g., 5-10V). In many cases, multiple voltage levels may be required within the same integrated circuit (IC).

Power converters are often used to generate a lower or higher voltage from a common power source, such as a battery. Power converters which generate a lower output voltage (e.g., $V_{OUT}$) level from a higher input voltage (e.g., $V_{IN}$) power source are commonly known as step-down or buck converters, so-called because $V_{OUT} < V_{IN}$, and hence the converter is "bucking" the input voltage. Power converters which generate a higher output voltage level from a lower input voltage power source are commonly known as step-up or boost converters, because $V_{OUT} > V_{IN}$. In many embodiments, a power converter may be bi-directional, being either a step-up or a step-down converter depending on how a power source is connected to the converter.

FIG. 1 is a block diagram of a circuit that includes a prior art power converter 100. In the illustrated example, the power converter 100 includes a converter circuit 102 and a controller 104. The converter circuit 102 is configured to receive an input voltage $V_{IN}$ from a voltage source 106 across terminals V1+, V1−, and transform the input voltage $V_{IN}$ into an output voltage $V_{OUT}$ across terminals V2+, V2−. The output voltage $V_{OUT}$ is generally coupled across an output capacitor $C_{OUT}$, across which may be connected a load 108. In some embodiments of the power converter 100, auxiliary circuitry (not shown), such as a bias voltage generator(s), a clock generator, a voltage control circuit, etc., may also be present and coupled to the converter circuit 102 and the controller 104.

The illustrated converter circuit 102 includes a charge pump. As used in this disclosure, the term "charge pump" refers to a switched-capacitor network configured to boost or buck $V_{IN}$ to $V_{OUT}$. A converter circuit 102 based on a charge pump uses capacitors (not shown in FIG. 1) to transfer charge from the input to the output of the power converter 100. These charge transfer capacitors are commonly known as "fly capacitors" or "pump capacitors", and may be external components coupled to an integrated circuit embodiment of the power converter 100.

Referring again to FIG. 1, the controller 104 receives a set of input signals and produces a set of output signals. Some of these input signals arrive along a signal path 110 connected to the converter circuit 102. These input signals carry information that is indicative of the operational state of the converter circuit 102. In the illustrated example, the controller 104 also receives at least a clock signal CLK and one or more external input/output signals I/O that may be analog, digital, or a combination of both. Based upon the received input signals, the controller 104 produces a set of control signals back to the converter circuit 102 along the signal path 110 that control the internal components of the converter circuit 102 (e.g., internal switches, such as low voltage FETs, especially MOSFETs) to cause the converter circuit 102 to boost or buck $V_{IN}$ to $V_{OUT}$.

Despite the varied types of known charge pumps, a need has been identified by the inventor for a charge pump that generates a fractional negative voltage output from a positive voltage input.

SUMMARY

The present invention encompasses charge pumps having a fractional negative voltage output from a positive voltage input. A control circuit provides for feedback control of the output of such a charge pump, and may include dynamic adjustment of the charge pump output based on one or more factors, including transistor device current leakage, transistor device geometry, and/or process-voltage-temperature (PVT) dependent variations in transistor device performance.

In some embodiments, two or more charge pumps are coupled in a differential configuration such that while one set of fly capacitors are in series charging, at least one other set of fly capacitors is discharging, thereby creating less electronic noise and providing a more balanced output voltage to a load.

In one embodiment, the invention encompasses a fractional negative voltage charge pump including n capacitors, where n≥2 and is an integer, configured to be coupled in series between an input voltage terminal and a ground terminal during a charging phase, and in parallel between the ground terminal and a negative voltage output terminal during a discharging phase. When a positive voltage is coupled to the input voltage terminal, the fractional negative voltage charge pump outputs at the negative voltage output terminal a negative voltage that is no more than 1/n of the positive voltage in magnitude.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

Figure 1:
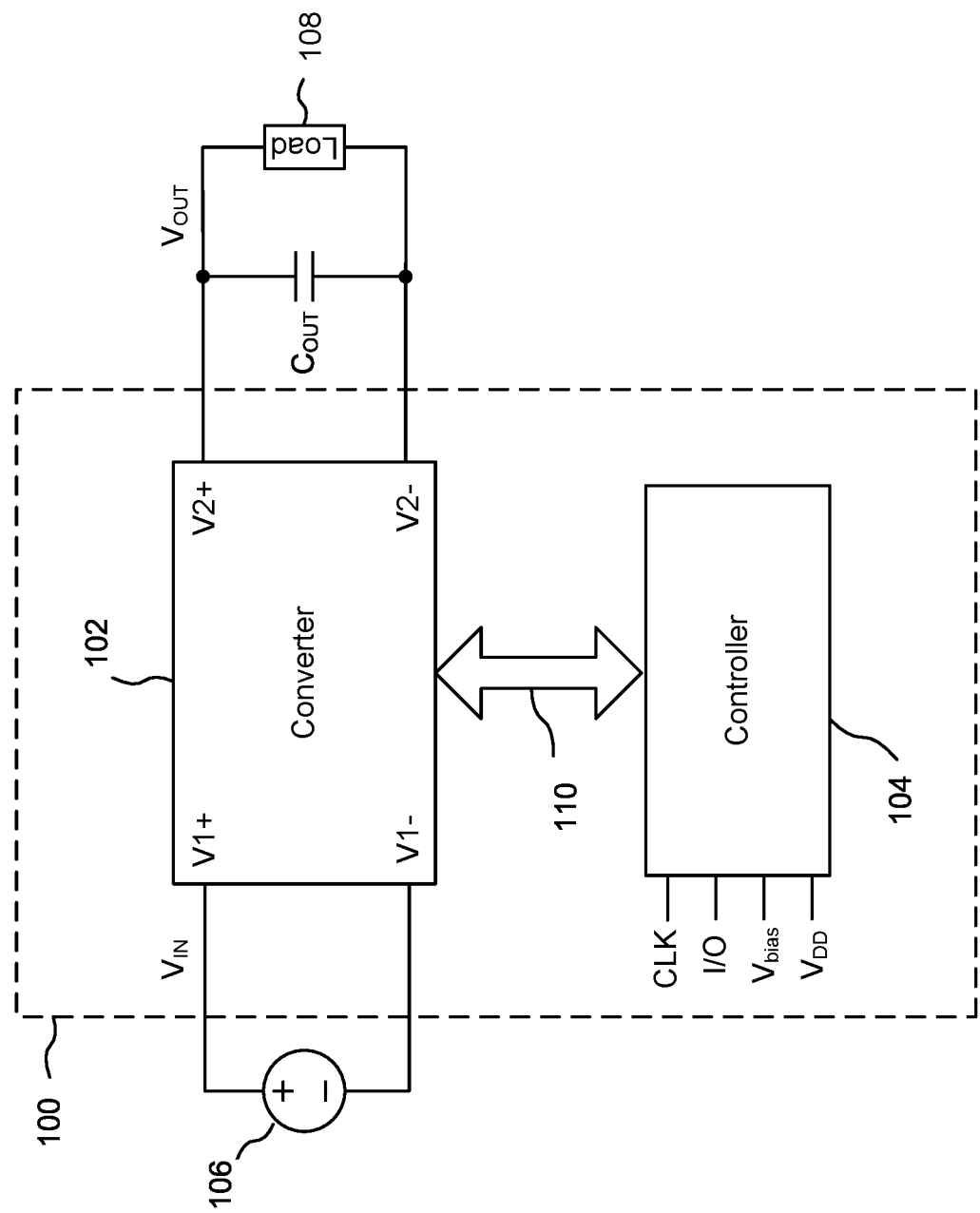
FIG. 1 is a block diagram of a circuit that includes a prior art power converter.

The present invention encompasses charge pumps having a fractional negative voltage output from a positive voltage input. A control circuit provides for feedback control of the output of such a charge pump, and may include dynamic adjustment of the charge pump output based on one or more factors, including transistor device current leakage, transistor device geometry, and/or process-voltage-temperature (PVT) dependent variations in transistor device performance.

In some embodiments, two or more charge pumps are coupled in a differential configuration such that while one set of fly capacitors are in series charging, at least one other set of fly capacitors is discharging, thereby creating less electronic noise and providing a more balanced output voltage to a load.

Example Application Need

In some applications, such as battery-powered radios (e.g., including cellular tele-phones), conservation of power usage is an important design criterion. A common design approach is to turn subcircuits OFF when not in use. For example, a cellphone may have numerous radio transmitters, receivers, and/or transceivers to provide for radio frequency (RF) communication capability across multiple frequencies in multiple bands. For instance, a cellphone may be capable of concurrently operating on different cellular communications systems (e.g., GSM and CDMA), on different wireless network frequencies and protocols (e.g., various IEEE 802.1 "WiFi" protocols at 2.4 GHz and 5 GHz), and on "personal" area networks (e.g., Bluetooth based systems). However, at times, some transmitters, receivers, and/or transceivers may not be in use. Accordingly, it is common to turn the most-power hungry associated circuits (such as power amplifiers and/or low-noise amplifiers) to the OFF (non-conductive) state when not in use.

One way to turn off an amplifier based on N-type MOSFETS (NFETS) is to set the gate-source voltage $V_{GS}$ to zero. However, in thin-oxide state-of-the-art RF processes, the gate of an amplifier NFET can be very large and current can leak from drain to source because the device may not be completely OFF with $V_{GS}=0V$. Such leakage current necessitates a negative voltage supply to completely shut OFF the drain-to-source leakage. However, thin-oxide devices can also have gate oxide leakage. To supply a negative voltage, a voltage supply would have to source significant gate leakage current (e.g., about 20 uA). This leakage current adds to the power consumption of an encompassing IC and can consume a significant amount of the IC current budget when the amplifier is in a disabled (OFF) mode.

By applying a negative gate bias to the NFETs, the devices will more completely shut OFF. However, many RF ICs are not provided with a negative supply. The lack of a negative supply can be overcome by using a negative charge pump. A conventional negative charge pump provides a negative voltage that is the inverse of a positive supply voltage—that is, $V_{OUT}=-V_{DD}$. For modern FET-based circuitry, $V_{DD}$ may range from about 1V to about 2V.

Figure 2A:
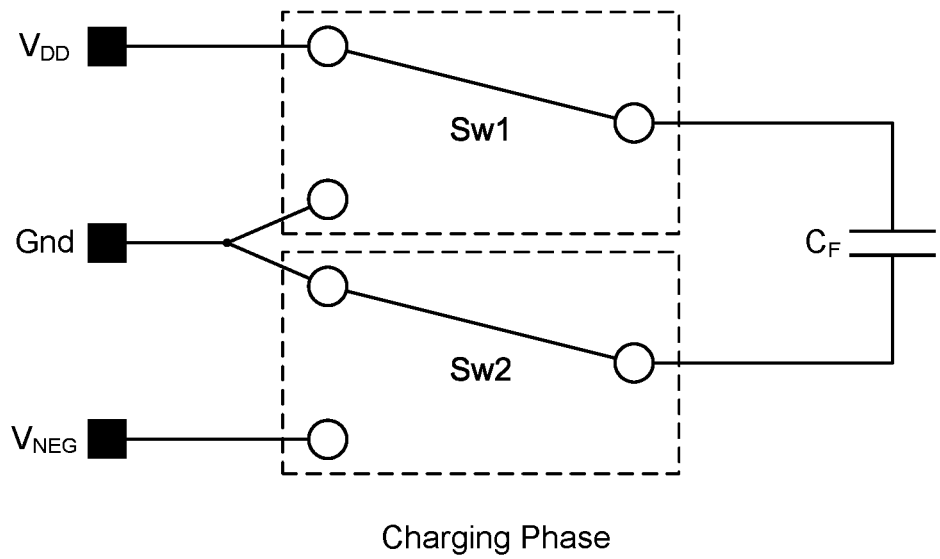
FIG. 2A is a block diagram of the charging phase of a prior art negative charge pump.
Figure 2B:
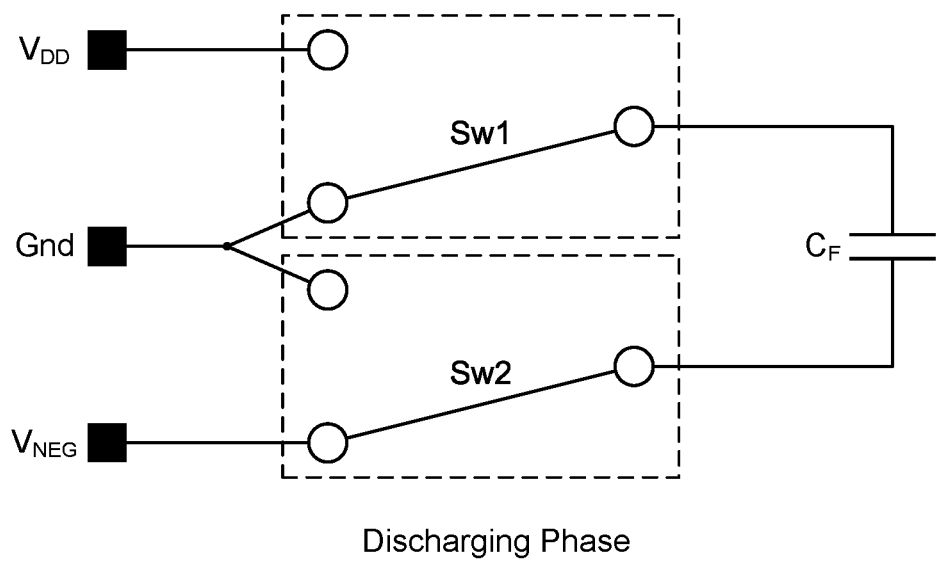
FIG. 2B is a block diagram of the discharging phase of a prior art negative charge pump.

FIG. 2A is a block diagram of the charging phase of a prior art negative charge pump. FIG. 2B is a block diagram of the discharging phase of a prior art negative charge pump. In the illustrated example, the charge pump includes (1) a first break-before-make (or OFF-before-ON) SPDT switch Sw1 having two throw terminals coupled to an input voltage supply $V_{DD}$ and ground (Gnd), respectively, and a pole terminal coupled to a first terminal of a fly capacitor $C_F$, and (2) a second break-before-make SPDT switch Sw2 having two throw terminals coupled to Gnd and a negative voltage output terminal $V_{NEG}$, respectively, and a pole terminal coupled to a second terminal of the fly capacitor $C_F$.

During a charging phase, SW1 connects $V_{DD}$ to the first terminal of the fly capacitor and SW2 connects Gnd to the second terminal of the fly capacitor. During a discharging phase, SW1 connects Gnd to the first terminal of the fly capacitor and SW2 connects $V_{NEG}$ to the second terminal of the fly capacitor. As SW1 and SW2 alternate, $V_{DD}$ is converted to $-V_{DD}$ at the $V_{NEG}$ output terminal, in known fashion.

In greater detail, assume for example that the $V_{NEG}$ terminal is initially at 0V and current is to be supplied to that terminal from the charge pump. During the charging phase, the charge Q that accumulates on the fly capacitor $C_F$ is $Q=C_F \times V_{DD}$. During the discharging phase, the charge $Q=0$ (i.e., all charge is supplied to a load at 0V). Assume that the charge pump operates at frequency $f_{CP}$, which typically may range from kHz (e.g., 50 kHz) to MHz (e.g., 5 MHz). Then the supply current $I_{DD}$ at the input is $I_{DD}=Q \times f_{CP}=C_F \times V_{DD} \times f_{CP}$, and the current $I_{OUT}$ supplied to the output $V_{NEG}$ terminal is also equal to $Q \times f_{CP}=C_F \times V_{DD} \times f_{CP}$. As a result, the effective output impedance when $V_{NEG}=0V$ is $R_{OUT}=dV/dI=V_{DD}/I_{OUT}=1/(C_F \times f_{CP})$. When there is no loading current, $V_{NEG}$ will approach $-V_{DD}$.

A problem with using the $-V_{DD}$ output voltage from a conventional negative charge pump as a gate bias is that the magnitude of the negative voltage may exceed a devices's $V_{GD-MAX}$ (thus negatively impacting reliability), and may also induce gate-induced drain leakage (GIDL), thus countering the desired goal of reducing drain current leakage. What is desirable is a negative charge pump that can provide a gate bias voltage for an NFET that is in a range that is more negative than 0V but does not exceed about −0.5V in magnitude. A preferred gate bias voltage range for many applications would be from about −0.2V to about −0.4V.

General Embodiment of a Charge Pump with Fractional Negative Voltage Output

One aspect of the present invention is the design of a charge pump that outputs a fractional negative voltage from a positive input voltage. One embodiment creates $V_{OUT}=-\frac{1}{2}V_{DD}$ and imposes a load current $I_{OUT}$ that is halved when presented to $V_{DD}$; that is, instead of supplying all the load current to $V_{DD}$, this embodiment of the novel charge pump only presents half the load current: $I_{DD}=\frac{1}{2} I_{OUT}$.

The basic concept of a $V_{OUT}=-\frac{1}{2}V_{DD}$ embodiment of the invention is to connect two fly capacitors $C_{F1}$, $C_{F2}$ in series with $V_{DD}$ during a charging phase such that each individual fly capacitor $C_{F1}$, $C_{F2}$ charges to $\frac{1}{2} V_{DD}$, and then reconfigure the connections of the fly capacitors $C_{F1}$, $C_{F2}$ to be in parallel between Gnd (+) and $V_{NEG}$ (−).

Figure 3A:
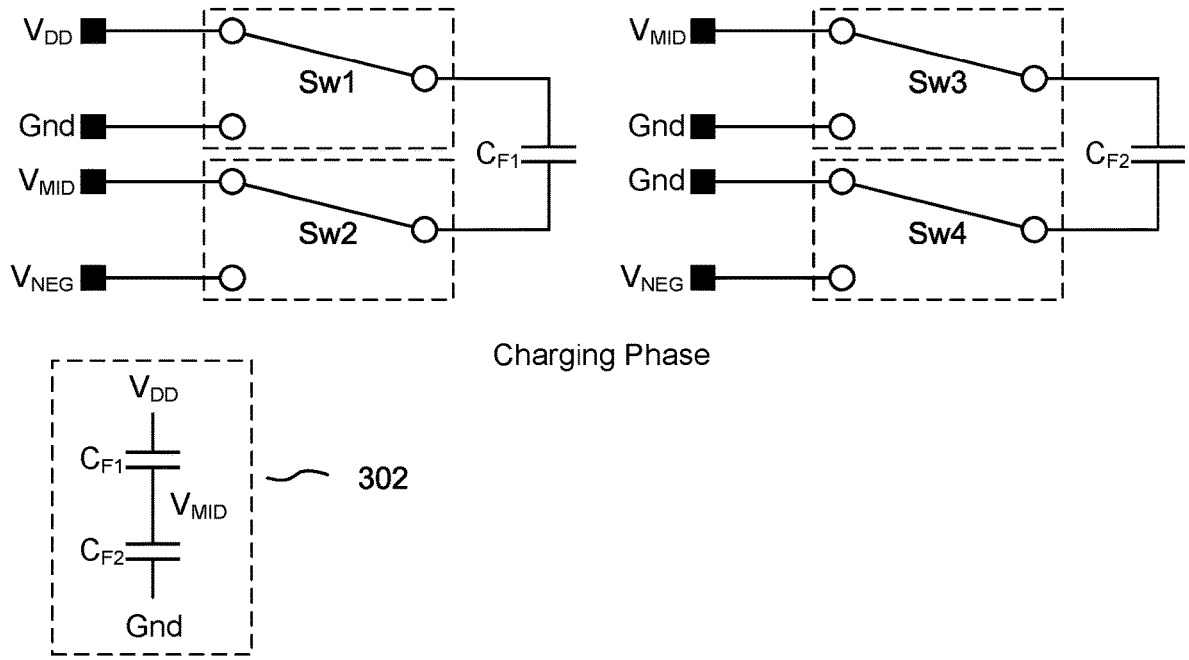
FIG. 3A is a block diagram of the charging phase of a $V_{OUT} = -\frac{1}{2} V_{DD}$ fractional negative charge pump in accordance with the present invention.
Figure 3B:
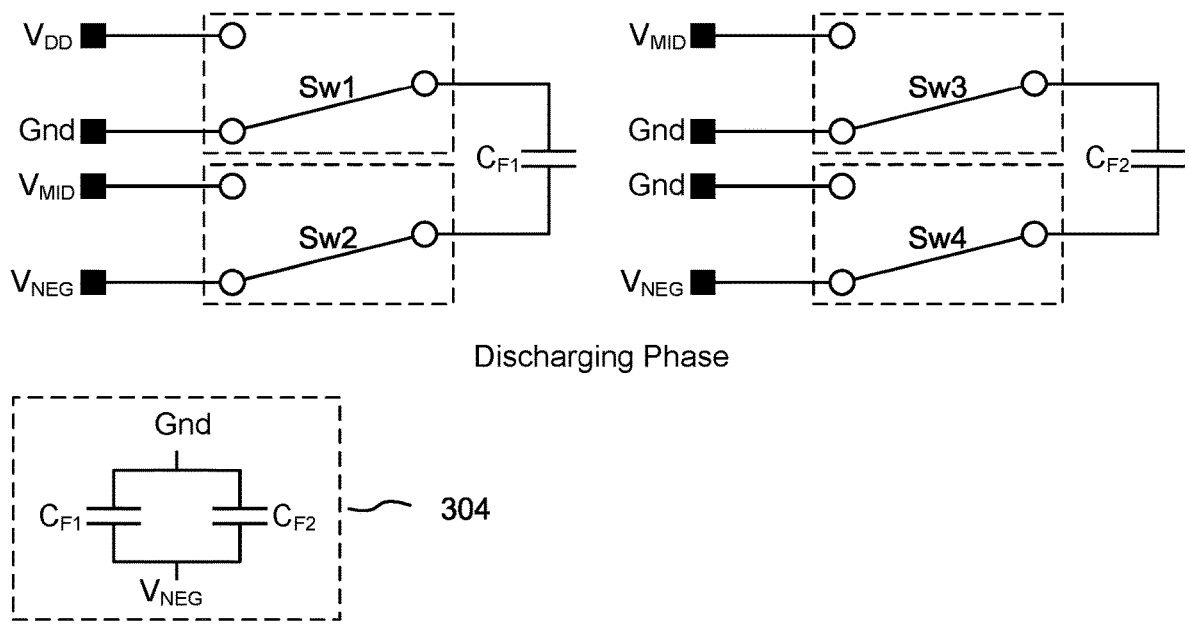
FIG. 3B is a block diagram of the discharging phase of a $V_{OUT} = -\frac{1}{2} V_{DD}$ fractional negative charge pump in accordance with the present invention.

FIG. 3A is a block diagram of the charging phase of a $V_{OUT}=-\frac{1}{2} V_{DD}$ fractional negative charge pump in accordance with the present invention. FIG. 3B is a block diagram of the discharging phase of a $V_{OUT}=-\frac{1}{2} V_{DD}$ fractional negative charge pump in accordance with the present invention. In the illustrated example, the generalized charge pump includes:

(1) a first break-before-make (or OFF-before-ON) SPDT switch Sw1 having two throw terminals coupled to an input voltage supply $V_{DD}$ and ground (Gnd), respectively, and a pole terminal coupled to a first terminal of a first fly capacitor $C_{F1}$;

(2) a second break-before-make SPDT switch Sw2 having two throw terminals coupled to a mid-voltage terminal $V_{MID}$ and a negative voltage output terminal $V_{NEG}$, respectively, and a pole terminal coupled to a second terminal of the first fly capacitor $C_{F1}$;

(3) a third break-before-make SPDT switch Sw3 having two throw terminals coupled to $V_{MID}$ and ground (Gnd), respectively, and a pole terminal coupled to a first terminal of a second fly capacitor $C_{F2}$; and (4) a fourth break-before-make SPDT switch Sw4 having two throw terminals coupled to Gnd and the negative voltage output terminal $V_{NEG}$, respectively, and a pole terminal coupled to a second terminal of the second fly capacitor $C_{F2}$.

During the charging phase, first fly capacitor $C_{F1}$ and second fly capacitor $C_{F2}$ are coupled in series, as shown in the inset schematic 302, by setting Sw1 and Sw2 to connect $C_{F1}$ between $V_{DD}$ and $V_{MID}$, and setting Sw3 and Sw4 to connect $C_{F2}$ between $V_{MID}$ and Gnd. During the discharging phase, first fly capacitor $C_{F1}$ and second fly capacitor $C_{F2}$ are coupled in parallel, as shown in the inset schematic 304, by setting Sw1 and Sw2 to connect $C_{F1}$ between Gnd and $V_{NEG}$, and setting Sw3 and Sw4 to connect $C_{F2}$ between Gnd and $V_{NEG}$. As the switch pairs Sw1-Sw2 and Sw3-SW4 alternate between the charging phase and the discharging phase, $V_{DD}$ is converted to $-\frac{1}{2} V_{DD}$ at the $V_{NEG}$ output terminal.

In greater detail, assume for example that the $V_{NEG}$ terminal is initially at 0V and current is to be supplied to that terminal from the fractional negative charge pump. During the charging phase, the charge Q that accumulates on the fly capacitors $C_{F1}$, $C_{F2}$ is $Q=C_F \times V_{DD}/2$ (i.e., one-half of the charge on the single fly capacitor $C_F$ in the conventional charge pump shown in FIGS. 2A-2B). During the discharging phase, the charge Q=0 (i.e., all charge is supplied to a load at 0V). Assume that the fractional negative charge pump operates at frequency $f_{CP}$, which typically may range from kHz to MHz. Then the supply current $I_{DD}$ at the input is $I_{DD}=Q\times f_{CP}=C_F\times(V_{DD}/2)\times f_{CP}$, while the current $I_{OUT}$ supplied to the output $V_{NEG}$ terminal from the parallel-connected fly capacitors $C_{F1}$, $C_{F2}$ is $I_{OUT}=2\times Q\times f_{CP}=C_F\times V_{DD}\times f_{CP}$. As a result, twice as much current is supplied to a load as is consumed by $V_{DD}$.

When there is no load current, $V_{NEG}=-\frac{1}{2} V_{DD}$. The effective output impedance when Vneg=0V is $R_{OUT}=dV/dI=(V_{DD}/2)/(C_F\times V_{DD}\times f_{CP})=1/(2\times C_F\times f_{CP})$. Thus, the output impedance of the example fractional negative charge pump is one-half of output impedance of a conventional negative charge pump, but from a less negative effective output voltage ($-\frac{1}{2} V_{DD}$ versus $-V_{DD}$). When the fractional negative charge pump drives a typical load, the output voltage generally will have a lower magnitude. Thus, for example, if $V_{DD}$=1V, the $V_{NEG}$ voltage may by only about −0.4 to −0.2V when the fractional negative charge pump drives a typical load. However, for many applications, such as providing additional gate OFF state negative drive voltage for an NFET, such a lower voltage magnitude is sufficient.

The basic concept shown in FIGS. 3A and 3B may be extended by adding more switches and fly capacitors to effect smaller fractional negative voltages and larger values of $I_{OUT}$. Thus, for example, for n fly capacitors, where n>2 and is an integer, an output voltage $V_{OUT}$ of $-1/n\times V_{DD}$ can be generated at an associated output current of $I_{OUT}=n\times I_{DD}$.

Example Embodiment

Figure 4A:
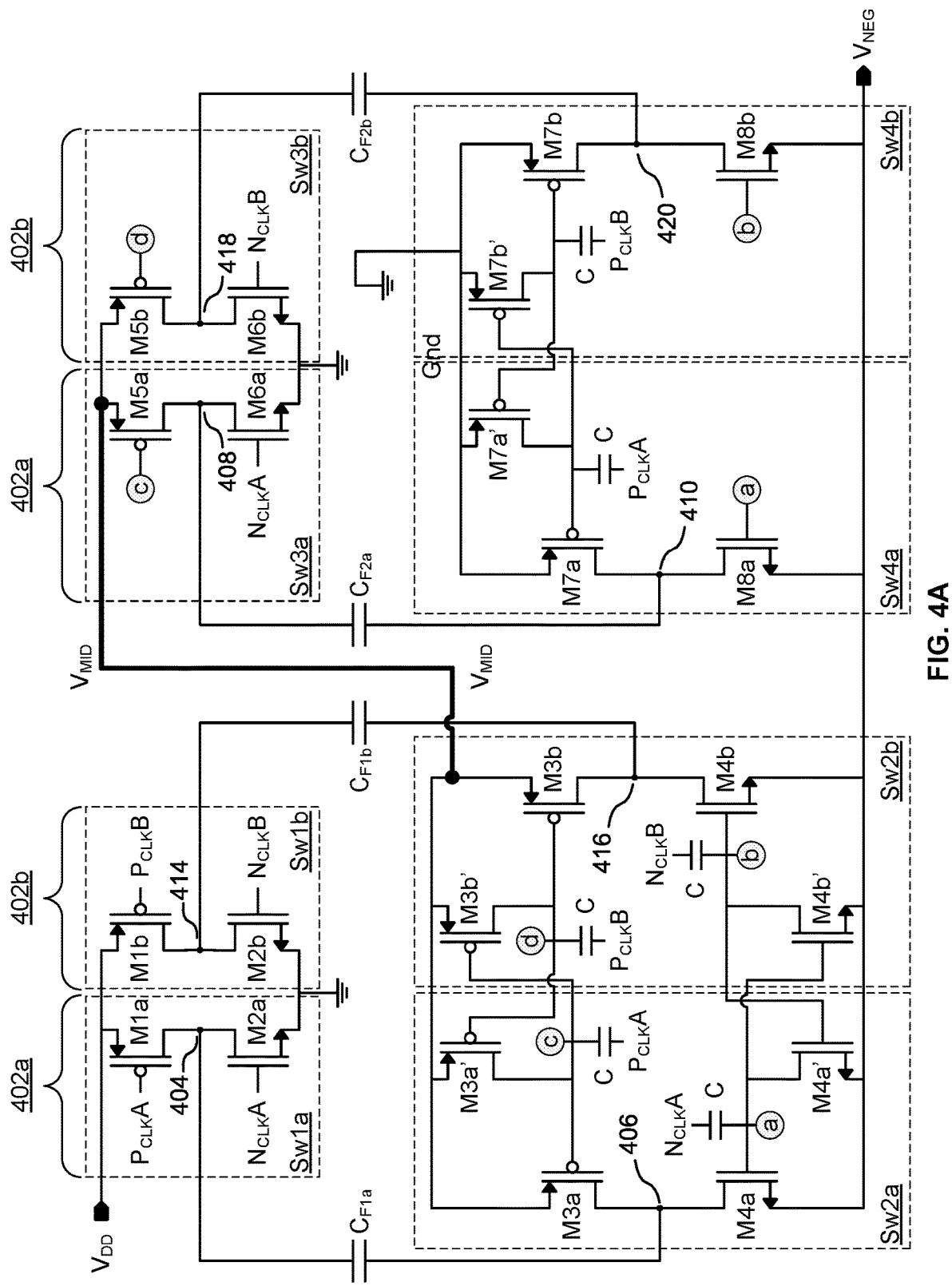
FIG. 4A is a schematic diagram of a differential embodiment of the present invention.

FIG. 4A is a schematic diagram of a differential embodiment of the present invention. Essentially, an "A" and "B" pair of fractional negative charge pumps 402a, 402b (shown vertically below the corresponding braces) of the type shown in FIGS. 3A and 3B are coupled in parallel between $V_{DD}$ and $V_{NEG}$. The fractional negative charge pumps 402a, 402b are controlled by respective pairs of clock signals $P_{CLKA}$, $N_{CLKA}$ and $P_{CLKB}$, $N_{CLKB}$ that are out of phase with respect to each other (see FIGS. 4B and 4C for details). More specifically, fractional negative charge pump 402a comprise switches Sw1a-Sw4a, and fractional negative charge pump 402b comprise switches Sw1b-Sw4b. Note that the circled letters a, b, c, d indicate linked nodes; connecting lines have been omitted to avoid clutter.

In the illustrated example, each switch includes a PFET having a conduction channel (between source and drain) coupled in series with the conduction channel of an NFET. Each switch is clocked by an associated clocking signal $P_{CLKA}$, $N_{CLKA}$ or $P_{CLKB}$, $N_{CLKB}$ (in some cases through an intervening DC blocking capacitor C). Within a switch, the conductive and blocking states of the PFET and NFET pair are complementary, such that when a "P" clocking signal turns the PFET ON, the complementary "N" clocking signal turns the NFET OFF, and vice versa. The associated clocking signals $P_{CLKA}$, $N_{CLKA}$, $P_{CLKB}$, and $N_{CLKB}$ serve to alternately couple a mid-point node between the PFET and NFET to a first potential or to a second potential. The mid-point nodes are in turn coupled to an associated terminal of a respective fly capacitor $C_{F1a}$, $C_{F2a}$ or $C_{F1b}$, $C_{F2b}$.

For example, within the "A" fractional negative charge pump 402a, switch Sw1a may be toggled to couple a mid-point node 404 to $V_{DD}$ or to Gnd, and switch Sw2a can be toggled to couple a mid-point node 406 to $V_{MID}$ or to $V_{NEG}$. Mid-point node 404 is coupled to a first ("top") terminal of fly capacitor $C_{F1a}$ while mid-point node 406 is coupled to a second ("bottom") terminal of fly capacitor $C_{F1a}$. Similarly, switch Sw3a may be toggled to couple a mid-point node 408 to $V_{MID}$ or to Gnd, and switch Sw4a can be toggled to couple a mid-point node 410 to Gnd or to $V_{NEG}$. Mid-point node 408 is coupled to a first ("top") terminal of fly capacitor $C_{F2a}$ while mid-point node 410 is coupled to a second ("bottom") terminal of fly capacitor $C_{F2a}$.

The configuration of the "B" fractional negative charge pump 402b is similar to the configuration of fractional negative charge pump 402a. Thus, switch Sw1b can be toggled to couple a mid-point node 414 to $V_{DD}$ or to Gnd, and switch Sw2b can be toggled to couple a mid-point node 416 to $V_{MID}$ or to $V_{NEG}$. Mid-point node 414 is coupled to a first ("top") terminal of fly capacitor $C_{F1b}$ while mid-point node 416 is coupled to a second ("bottom") terminal of fly capacitor $C_{F1b}$. Similarly, switch Sw3b can be toggled to couple a mid-point node 418 to $V_{MID}$ or to Gnd, and switch Sw4b can be toggled to couple a mid-point node 420 to Gnd or to $V_{NEG}$. Mid-point node 418 is coupled to a first ("top")

terminal of fly capacitor $C_{F_2}b$ while mid-point node 420 is coupled to a second ("bottom") terminal of fly capacitor $C_{F_2}a$.

It may be noted that switches Sw2a, Sw3a, Sw4a, Sw2b, Sw3b and Sw4b include extra circuitry in the form of differential clock translators. In particular, the clock signals that drive the ON/OFF state of switches M3a, M4a, M5a, M7a, and M8a, and of switches M3b, M4b, M5b, M7b, and M8b generally need to be level-shifted to a voltage range different from the normal supply voltage range. In the illustrated example, level shifting is accomplished by including cross-coupled switches M3a' and M3b' for switches M3a, M3b, M5a, and M5b, cross-coupled switches M4a' and M4b' for switches M4a, M4b, M8a, and M8b, and cross-coupled switches M7a' and M7b' for switches M7a and M7b. The differential clock translators provide for clock signal level shifting that avoids shoot-through current and loss due to simultaneous switching, and a high level of clock signal voltage swing. The pairs of cross-coupled switches operate as described in U.S. Pat. No. 11,011,981, issued May 18, 2021, entitled "Differential Clock Level Translator for Charge Pumps", which is assigned to the assignee of the present invention and is hereby incorporated by reference; see, for example, FIGS. 6A and 6B and the accompanying text of the referenced patent.

In operation, during the charging phase of fractional negative charge pump 402a, fly capacitors $C_{F1a}$ and $C_{F2a}$ are coupled in series by setting Sw1a and Sw2a to connect $C_{F1a}$ between $V_{DD}$ and $V_{MID}$, and setting Sw3a and Sw4a to connect $C_{F2a}$ between $V_{MID}$ and Gnd. During the discharging phase of fractional negative charge pump 402a, fly capacitors $C_{F1a}$ and $C_{F2a}$ are coupled in parallel by setting Sw1a and Sw2a to connect $C_{F1a}$ between Gnd and $V_{NEG}$, and setting Sw3a and Sw4a to connect $C_{F2a}$ between Gnd and $V_{NEG}$. As the switch pairs Sw1a-Sw2a and Sw3a-SW4a alternate between the charging phase and the discharging phase as determined by the clocking signals PC LK A and $N_{CLKA}$ (with level shifting assisted by differential clocking signals $P_{CLKB}$ and $N_{CLKB}$), $V_{DD}$ is converted to $-\frac{1}{2} V_{DD}$ at the $V_{NEG}$ output terminal.

Similarly, in a different phase of clocking signals, during the charging phase of fractional negative charge pump 402b, fly capacitors $C_{F1b}$ and $C_{F2b}$ are coupled in series by setting Sw1b and Sw2b to connect $C_{F1b}$ between $V_{DD}$ and $V_{MID}$, and setting Sw3a and Sw4a to connect $C_{F2b}$ between $V_{MID}$ and Gnd. During the discharging phase of fractional negative charge pump 402b, fly capacitors $C_{F1b}$ and $C_{F2b}$ are coupled in parallel by setting Sw1b and Sw2b to connect $C_{F1b}$ between Gnd and $V_{NEG}$, and setting Sw3b and Sw4b to connect $C_{F2b}$ between Gnd and $V_{NEG}$. As the switch pairs Sw1b-Sw2b and Sw3b-SW4b alternate between the charging phase and the discharging phase as determined by the clocking signals $P_{CLKB}$ and $N_{CLKB}$ (with level shifting assisted by differential clocking signals $P_{CLKA}$ and $N_{CLKA}$), $V_{DD}$ is converted to $-\frac{1}{2} V_{DD}$ at the $V_{NEG}$ output terminal.

As should be appreciated, the timing of the clocking signals $P_{CLKA}$, $N_{CLKA}$ or $P_{CLKB}$, $N_{CLKB}$ can be set so while one set of fly capacitors are in series charging (e.g., CH a, $C_{F2a}$), another set of fly capacitors is discharging (e.g., $C_{F1b}$, $C_{F2b}$), thereby creating less electronic noise and providing a more balanced output voltage to a load. Further, additional fractional negative charge pumps may be coupled in parallel with the two fractional negative charge pumps illustrated in FIG. 4A and operated by corresponding clocking signals phase shifted from the clocking signals $P_{CLKA}$, $N_{CLKA}$, $P_{CLKB}$, and $N_{CLKB}$. An even smoother output can be achieved by coupling a shunt capacitor $C_{OUT}$ at the $V_{NEG}$ terminal, as in FIGS. 5A and 5B.

Figure 4B:
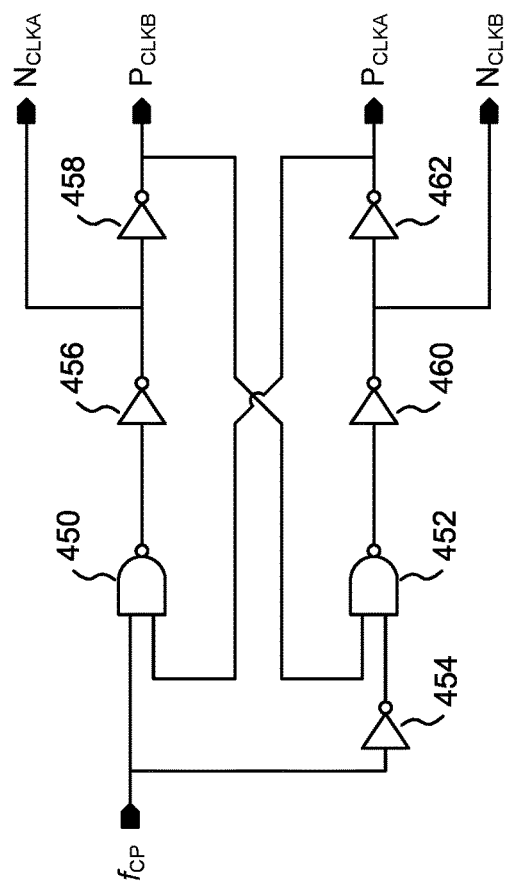
FIG. 4B is a schematic diagram of clock generation circuit that may be used to generate the various clock signals shown in FIG. 4A.

FIG. 4B is a schematic diagram of clock generation circuit that may be used to generate the various clock signals shown in FIG. 4A. An input frequency $f_{CP}$, such as from a conventional oscillator, is applied to an input of a first NAND gate 450, and to an input of a second NAND gate 452 after inversion by a first inverter 454. The output of the first NAND gate 450 is coupled to a second inverter 456, the output of which comprises clock signal $N_{CLKA}$, which is also coupled to a third inverter 458. The output of the third inverter 458 comprises clock signal $P_{CLKB}$ and is also cross-coupled to an input of the second NAND gate 452. The output gates should be configured to provide sufficient drive currents to the coupled circuit elements such as those shown in FIG. 4A.

Similarly, the output of the second NAND gate 452 is coupled to a fourth inverter 460, the output of which comprises clock signal $N_{CLKB}$, which is also coupled to a fifth inverter 462. The output of the fifth inverter 462 comprises clock signal PC LK A and is also cross-coupled to an input of the first NAND gate 450. As should be appreciated, other circuits may be used to generate the various clock signals shown in FIG. 4A. For example, NAND gate 450 and inverter 456, and NAND gate 452 and inverter 460, may be replaced respectively by AND gates in some embodiments, so long as the AND gates provide sufficient drive currents to the coupled circuit elements such as those shown in FIG. 4A.

Figure 4C:
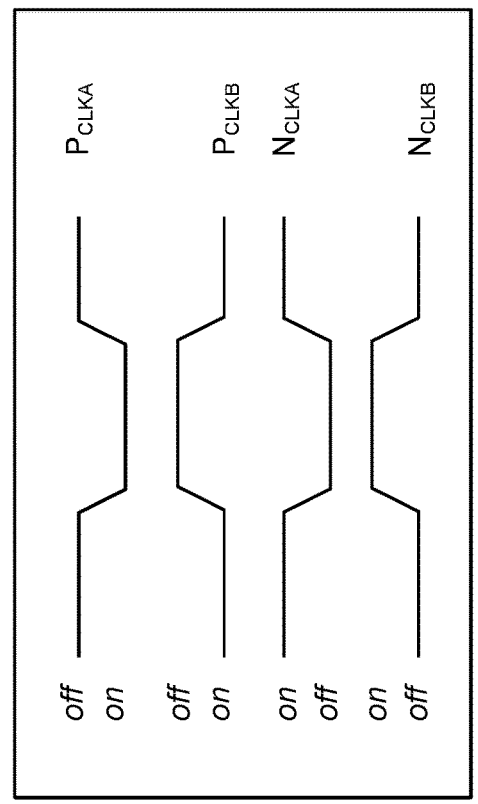
FIG. 4C is a timing diagram of the outputs of the circuit shown in FIG. 4B.

FIG. 4C is a timing diagram of the outputs of the circuit shown in FIG. 4B. As the graph lines should make clear, the pairs of clocking signals $N_{CLKA}$, $N_{CLKB}$ and $P_{CLKB}$, $P_{CLKA}$ are respectively complementary and essentially non-overlapping to avoid race or shoot-through conditions. Thus, $N_{CLKA}$ transitions to OFF before $N_{CLKB}$ transitions to ON (and vice versa), and PC LK A transitions to OFF before $P_{CLKB}$ transitions to ON (and vice versa). In addition, $N_{CLKA}$ transitions to OFF before $P_{CLKA}$ transitions to ON (and vice versa), and $N_{CLKB}$ transitions to OFF before $P_{CLKB}$ transitions to ON (and vice versa).

Referring to FIG. 4A, an NFET coupled to one of the clocking signals $N_{CLKA}$, $N_{CLKB}$ is turned ON when the corresponding clocking signal $N_{CLKA}$, $N_{CLKB}$ is in the high state, and turned OFF when the corresponding clocking signal $N_{CLKA}$, $N_{CLKB}$ is in the low state. Conversely, a PFET coupled to one of the clocking signals $P_{CLKA}$, $P_{CLKB}$ is turned ON when the corresponding clocking signal $P_{CLKA}$, $P_{CLKB}$ is in the low state, and turned OFF when the corresponding clocking signal $P_{CLKA}$, $P_{CLKB}$ is in the high state.

Consideration of the circuit of FIG. 4B should make clear that various inverter delays will occur for the illustrated circuit. In most applications, such a delay should not be significant. As should be clear, other circuits may be used to generate the clocking signals $N_{CLKA}$, $N_{CLKB}$, $P_{CLKA}$, and $P_{CLKB}$ Control Circuit Example The examples of fractional negative voltage charge pumps (differential and non-differential) disclosed above output a low-load voltage $V_{OUT}$ of $-1/n \times V_{DD}$, where n>2, when the clocking frequency $f_{CP}$ is at a nominal design frequency. As noted above, when a fractional negative charge pump drives a typical load, the output voltage usually will have a lower magnitude that generally will vary with the load. In addition, the voltage output by an IC embodiment of a fractional negative charge pump may vary as a function of process/voltage/temperature (PVT) parameter values (particularly temperature) and/or device geometry (e.g., FET gate oxide thickness, channel length, etc.).

Figure 5A:
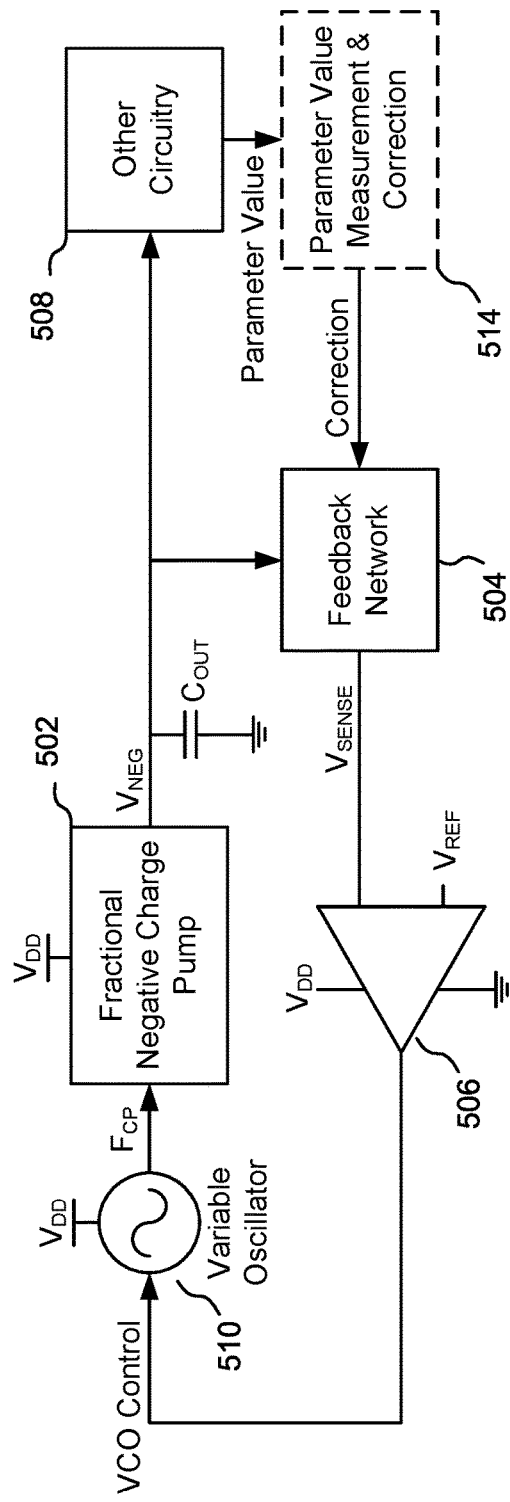
FIG. 5A shows a fractional negative charge pump coupled to a first embodiment of a feedback network and control signal generator.

Accordingly, it may be useful in many applications to include feedback and control circuitry to maintain regulated output voltages under varying load conditions over PVT. For example, FIG. 5A shows a fractional negative charge pump 502 coupled to a first embodiment of a feedback network 504 and control signal generator 506. The fractional negative charge pump 502 may have a differential or a non-differential architecture, and is configured to output a voltage $V_{NEG}$ to other circuitry 508, such as to an RF amplifier as a negative gate bias voltage. The feedback network 504 is configured to monitor $V_{NEG}$ and generate an output voltage $V_{SENSE}$ proportional to $V_{NEG}$. The feedback network 504 may be, for example, a resistive voltage divider.

The output of the feedback network 504 is coupled to a first input of a control signal generator 506, which may be, for example, an operational amplifier (op-amp) powered by $V_{DD}$. A second input of the control signal generator 506 is coupled to a reference voltage $V_{REF}$, which may be from, for example, a bandgap voltage reference circuit (not shown). The output of the control signal generator 506 is coupled as a control signal to a voltage-controlled oscillator (VCO) 510, which outputs a variable frequency signal $f_{CP}$ to the fractional negative charge pump 502 from which the clocking signals to the internal switches are generated.

In operation, if $V_{NEG}$ decreases in magnitude (e.g., because the load imposed by the other circuitry 508 increased), then $V_{SENSE}$ typically will increase relative to $V_{REF}$, causing the output of the control signal generator 506 to increase the frequency of $f_{CP}$, thus increasing the magnitude of the $V_{NEG}$ output of the fractional negative charge pump 502. Conversely, if $V_{NEG}$ increases in magnitude (e.g., because the load imposed by the other circuitry 508 decreased), then $V_{SENSE}$ typically will decrease relative to $V_{REF}$, causing the output of the control signal generator 506 to decrease the frequency of $f_{CP}$, thus decreasing the magnitude of the $V_{NEG}$ output of the fractional negative charge pump 502.

Figure 5B:
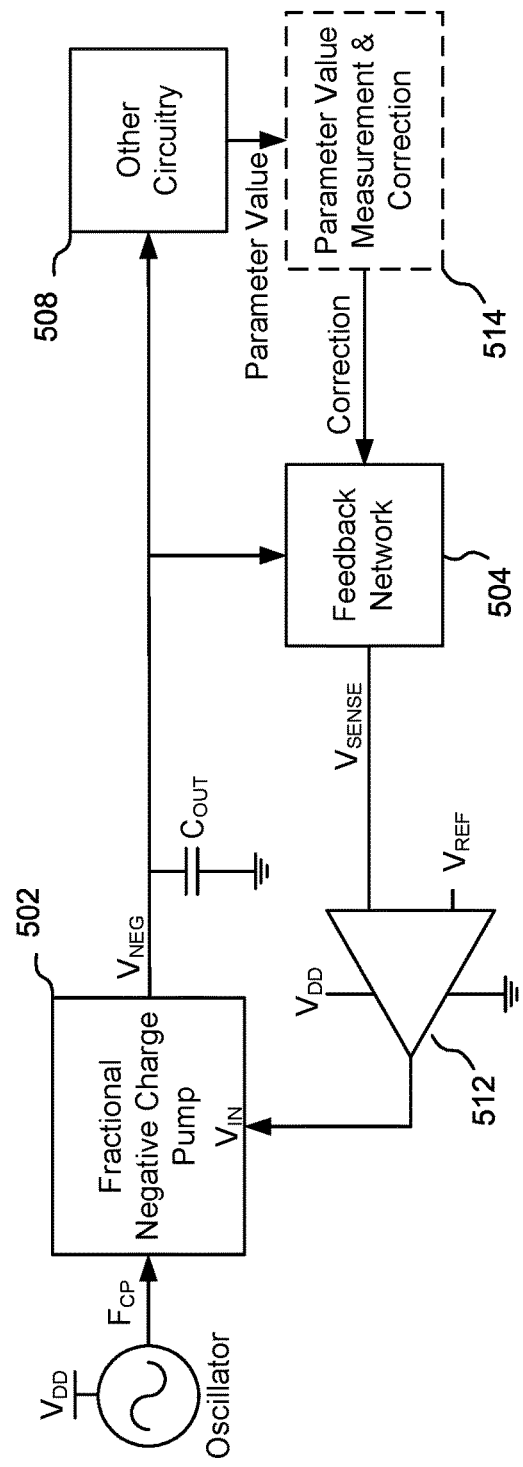
FIG. 5B shows a fractional negative charge pump coupled to a second embodiment of a feedback network and control signal generator.

As another example of feedback and control circuitry, FIG. 5B shows a fractional negative charge pump 502 coupled to a second embodiment of a feedback network 504 and control signal generator 512. The fractional negative charge pump 502 is configured to output a voltage $V_{NEG}$ to other circuitry 508, such as an RF amplifier. The feedback network 504 is configured to monitor $V_{NEG}$ and generate an output voltage $V_{SENSE}$ proportional to $V_{NEG}$. Again, the feedback network 504 may be, for example, a resistive voltage divider.

The output of the feedback network 504 is coupled to a first input of a control signal generator 512, which may be, for example, an op-amp powered by $V_{DD}$. A second input of the control signal generator 512 is coupled to a reference voltage $V_{REF}$, which may be from, for example, a bandgap voltage reference circuit (not shown). The output of the control signal generator 512 is provided to a $V_{IN}$ terminal of the fractional negative charge pump 502 to directly vary the supplied input voltage to the fractional negative charge pump 502 as a function of variation in $V_{NEG}$ relative to $V_{REF}$.

In operation, if $V_{NEG}$ decreases in magnitude, then $V_{SENSE}$ typically will increase relative to $V_{REF}$, causing the output of the control signal generator 506 to increase the voltage applied to the $V_{IN}$ terminal of the fractional negative charge pump 502, thus increasing the proportionate fractional output $V_{NEG}$. Conversely, if $V_{NEG}$ increases in magnitude, then $V_{SENSE}$ typically will decrease relative to $V_{REF}$, causing the output of the control signal generator 506 to decrease the voltage applied to the $V_{IN}$ terminal of the fractional negative charge pump 502, thus decreasing the proportionate fractional output $V_{NEG}$.

In some applications, it may be useful to precisely control the value of $V_{NEG}$ for a spec-ified purpose. For example, it may be useful to measure the value of a parameter associated with a circuit (e.g., an amplifier), and dynamically adjust $V_{NEG}$ as a function of the measured parameter value. Referring again to FIGS. 5A and 5B, an optional parameter value measurement and correction circuit 514 may be coupled (e.g., electrically, electromagnetically, or thermally) to other circuitry 508 to measure a selected parameter value, such as the temperature of or near the other circuitry 508, or a voltage or current (including leakage current such as gate leakage current) associated with the other circuitry 508. The measured parameter value may then be used to generate a correction signal that may be applied, among other circuit nodes or inputs, to the feedback network 504 to adjust the circuitry that generates $V_{SENSE}$. For example, the feedback network 504 may include a resistive voltage divider having a voltage-variable resistor.

Generation of the correction signal from the parameter value measurement and correction circuit 514 may be performed in a number of known ways. For example, the measured parameter value may be converted to a digital representation (e.g., by an analog to digital converter) and applied to a look-up table (LUT) containing a mapping of measured parameter values to correction signal values.

As another example, the measured parameter value may be periodically sampled by an analog or digital sample-and-hold circuit so that a parameter value measured at a first time T0 can be compared to a parameter value measurement made at a second time Ti. The difference in measured parameter values may then be used to generate a correction signal value, such as by being applied to a LUT to select a correction signal value.

As yet another example, a number of parameter value measurements may be digitized and accumulated in order to compute a time-varying average value. The averaged value may then be used to generate a correction signal value, such as by being applied to a LUT to select a correction signal value.

Values within a LUT within the parameter value measurement and correction circuit 514 may be determined during individual IC chip testing, or by characterization of representative ICs, or by circuit modeling during the design of an IC embodiment.

Circuit Embodiments

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Figure 6:
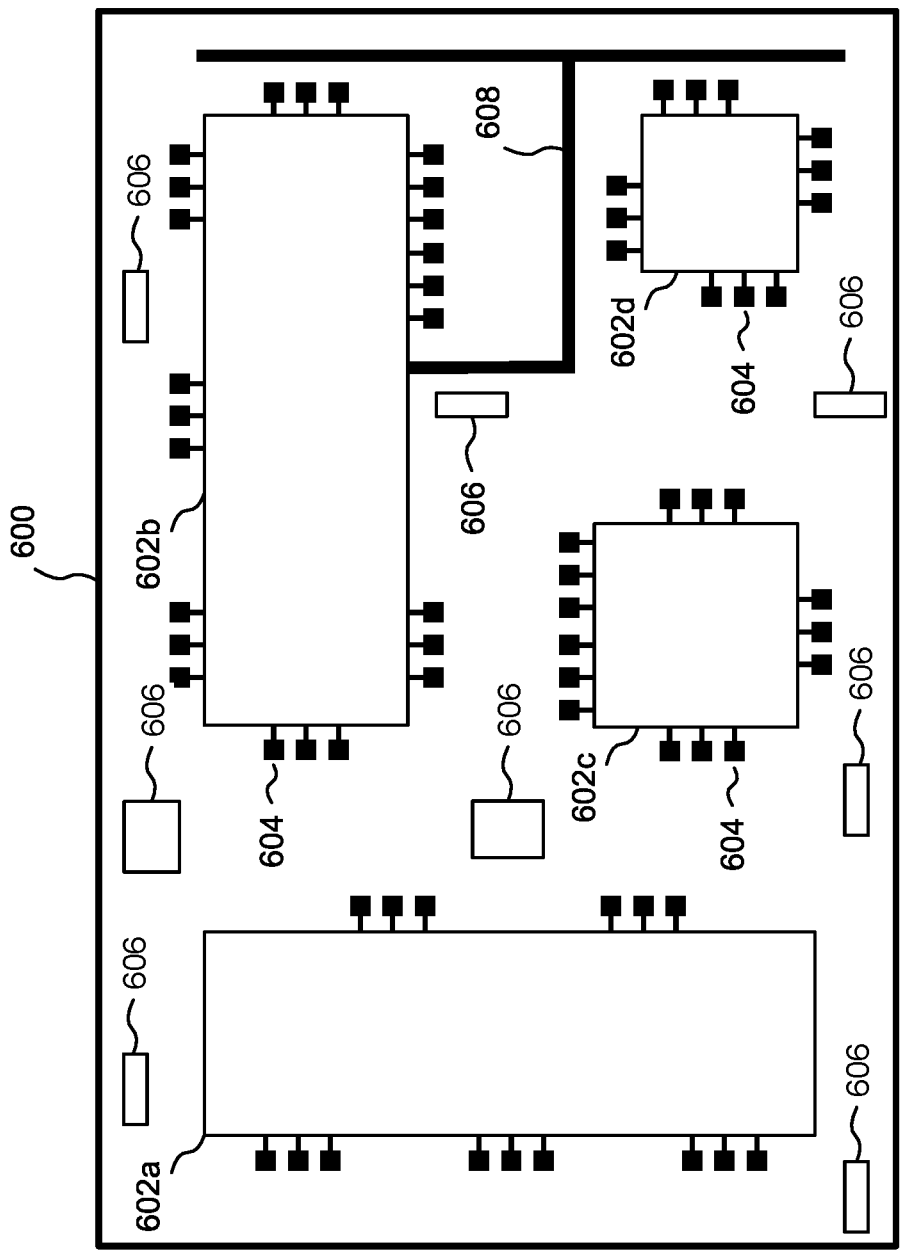
FIG. 6 is a top plan view of a substrate that may be, for example, a printed circuit board or chip module substrate (e.g., a thin-film tile).

As one example of further integration of embodiments of the present invention with other components, FIG. 6 is a top plan view of a substrate 600 that may be, for example, a printed circuit board or chip module substrate (e.g., a thin-film tile). In the illustrated example, the substrate 600 includes multiple ICs 602a-602d having terminal pads 604 which would be interconnected by conductive vias and/or traces on and/or within the substrate 600 or on the opposite (back) surface of the substrate 600 (to avoid clutter, the surface conductive traces are not shown and not all terminal pads are labelled). The ICs 602a-602d may embody, for example, signal switches, active filters, amplifiers (including one or more LNAs), and other circuitry. For example, IC 602b may incorporate one or more instances of a fractional negative voltage charge pump circuit like the circuits shown in FIGS. 3A, 3B, and 4A.

The substrate 600 may also include one or more passive devices 606 embedded in, formed on, and/or affixed to the substrate 600. While shown as generic rectangles, the passive devices 606 may be, for example, filters, capacitors, inductors, transmission lines, resistors, planar antennae elements, transducers (including, for example, MEMS-based transducers, such as accel-erometers, gyroscopes, microphones, pressure sensors, etc.), batteries, etc., interconnected by conductive traces on or in the substrate 600 to other passive devices 606 and/or the individual ICs 602a-602d.

The front or back surface of the substrate 600 may be used as a location for the for-mation of other structures. For example, one or more antennae may be formed on or affixed to the front or back surface of the substrate 600; one example of a front-surface antenna 608 is shown, coupled to an IC die 602b, which may include RF front-end circuitry. Thus, by including one or more antennae on the substrate 600, a complete radio may be created.

System Aspects

Embodiments of the current invention enable the provision of a fractional negative power source to other circuit modules or blocks, such as an amplifier. As a person of ordinary skill in the art will understand, the system architecture is beneficially impacted by the current invention in critical ways, including lower power and longer battery life.

Embodiments of the present invention are useful in a wide variety of applications, particularly radio frequency (RF) circuits useful in a variety of applications, such as radar systems (including phased array and automotive radar systems), radio communication systems (including cellular radio systems), and test equipment.

Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 5G, 6G, and WiFi (e.g., 802.11a, b, g, ac, ax, be) protocols, as well as other radio communication standards and protocols.

Methods

Figure 7:
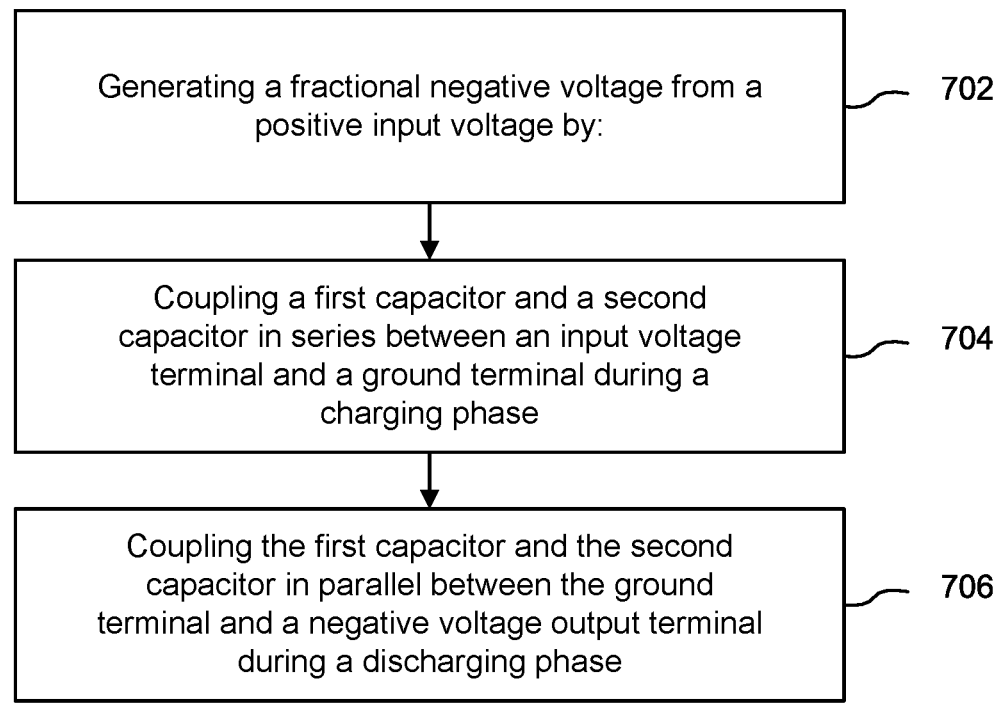
FIG. 7 is a process flow chart showing one method for generating a fractional negative voltage from a positive input voltage.

Another aspect of the invention includes methods for generating a fractional negative voltage. For example, FIG. 7 is a process flow chart 700 showing one method for generating a fractional negative voltage from a positive input voltage (Block 702). The method includes: coupling a first capacitor and a second capacitor in series between an input voltage terminal and a ground terminal during a charging phase (Block 704); and coupling the first capacitor and the second capacitor in parallel between the ground terminal and a negative voltage output terminal during a discharging phase (Block 706).

Additional aspects of the above method may include one or more of the following: wherein when the positive voltage is coupled to the input voltage terminal, the fractional negative voltage charge pump outputs at the negative voltage output terminal a negative voltage that is no more than one-half of the positive voltage in magnitude; and/or controlling the charging phase and the discharging phase using complementary and non-overlapping clocking signals.

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor struc-ture. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions may be greatly exaggerated vertically and/or horizon-tally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable sub-strates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as BiC-MOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implemen-tation is particularly useful since parasitic capacitances generally can be kept low (or at a mini-mum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufac-tures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a con-flicting labeling sequence).

What is claimed is:

1. A fractional negative voltage charge pump including:
   (a) a first switch comprising a first pair of PFET and NFET transistors having respective conduction channels coupled in series between an input voltage terminal and a ground terminal, and having a first mid-point node located between the first pair of transistors;
   (b) a second switch comprising a second pair of PFET and NFET transistors having respective conduction channels coupled in series between a mid-voltage terminal and a negative voltage output terminal, and having a second mid-point node located between the second pair of transistors;
   (c) a third switch comprising a third pair of PFET and NFET transistors having respective conduction channels coupled in series between the mid-voltage terminal and the ground terminal, and having a third mid-point node located between the third pair of transistors;
   (d) a fourth switch comprising a fourth pair of PFET and NFET transistors having respective conduction channels coupled in series between the ground terminal and the negative voltage output terminal, and having a fourth mid-point node located between the fourth pair of transistors;
   (e) a first capacitor having:
      (1) a first terminal coupled to the first mid-point node and switchably connectable through the first switch to the input voltage terminal during a charging phase and to the ground terminal during a discharging phase; and
      (2) a second terminal coupled to the second mid-point node and switchably connectable through the second switch to the mid-voltage terminal during the charging phase and to the negative voltage output terminal during the discharging phase;
   (f) a second capacitor having:
      (1) a first terminal coupled to the third mid-point node and switchably connectable through the third switch to the mid-voltage terminal during the charging phase and to the ground terminal during the discharging phase; and
      (2) a second terminal coupled to the fourth mid-point node and switchably connectable through the fourth switch to the ground terminal during the charging phase and to the negative voltage output terminal during the discharging phase;
   (g) a clock generation circuit coupled to the first, second, third, and fourth switches and configured to output an NFET clock signal and a PFET clock signal to respective PFET and NFET transistors of the first, second, third, and fourth switches, wherein the NFET and PFET clock signals are complementary and essentially non-overlapping;
   (h) a first differential clock translator circuit coupled to the second switch and configured to provide level shifting for the respective NFET and PFET clock signals coupled to the second switch;
   (i) the first differential clock translator circuit coupled to the third switch and configured to provide level shifting for the and PFET clock signal coupled to the third switch; and
   (j) a third differential clock translator circuit coupled to the fourth switch and configured to provide level shifting for the and PFET clock signal coupled to the fourth switch.

2. The invention of claim 1, wherein the charging phase and the discharging phase are controlled by the complementary and non-overlapping clocking signals of the NFET and PFET clock signals.

3. The invention of claim 1, further including:
   (a) a feedback network coupled to the negative voltage output terminal and configured to monitor an output voltage at the negative voltage output terminal and generate an output voltage proportional to the output voltage; and
   (b) a control signal generator coupled to the feedback network and the fractional negative voltage charge pump, the control signal generator configured to output a control signal as a function of the output voltage;
   wherein the control signal from the feedback network regulates a variable frequency applied to the fractional negative voltage charge pump.

4. The invention of claim 1, further including:
   (a) a feedback network coupled to the negative voltage output terminal and configured to monitor an output voltage at the negative voltage output terminal and generate an output voltage proportional to the output voltage; and
   (b) a control signal generator coupled to the feedback network and to the input voltage terminal of the fractional negative voltage charge pump, the control signal generator configured to apply an input voltage to the fractional negative voltage charge pump through the input voltage terminal where the input voltage is as a function of the output voltage.

\* \* \* \* \*